(12) United States Patent
Castanon et al.

(10) Patent No.: US 10,275,656 B2
(45) Date of Patent: Apr. 30, 2019

(54) LARGE SCALE VIDEO SEARCH USING QUERIES THAT DEFINE RELATIONSHIPS BETWEEN OBJECTS

(71) Applicant: Trustees of Boston University, Boston, MA (US)

(72) Inventors: Gregory D. Castanon, Jamaica Plain, MA (US); Venkatesh Saligrama, Newton, MA (US); Ziming Zhang, Boston, MA (US); Yuting Chen, Framingham, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 154 days.

(21) Appl. No.: 15/526,670

(22) PCT Filed: Nov. 20, 2015

(86) PCT No.: PCT/US2015/061949
§ 371 (c)(1),
(2) Date: May 12, 2017

(87) PCT Pub. No.: WO2016/081880
PCT Pub. Date: May 26, 2016

(65) Prior Publication Data
US 2017/0357853 A1   Dec. 14, 2017

Related U.S. Application Data

(60) Provisional application No. 62/082,918, filed on Nov. 21, 2014, provisional application No. 62/109,203, filed on Jan. 29, 2015.

(51) Int. Cl.
*G06K 9/62* (2006.01)
*G06K 9/00* (2006.01)
(Continued)

(52) U.S. Cl.
CPC ... *G06K 9/00758* (2013.01); *G06F 17/30017* (2013.01); *G06F 17/3079* (2013.01);
(Continued)

(58) Field of Classification Search
CPC ...................................... G06K 9/00
(Continued)

(56) References Cited

U.S. PATENT DOCUMENTS 7,898,576 B2   3/2011   Miller et al.
8,027,512 B2   9/2011   Jaspers et al.
(Continued)

OTHER PUBLICATIONS

Castañón et al., "Exploratory Search of Long Surveillance Videos", Proceedings of the 20th ACM International Conference of Multimedia, Nara, Japan, pp. 309-318, Oct. 29-Nov. 2, 2012.
(Continued)

*Primary Examiner* — Jerome Grant, II
(74) *Attorney, Agent, or Firm* — Nutter McClennen & Fish LLP

(57) ABSTRACT

One embodiment of the present solution is a relationship-based video server system. The server system is programmed to provide a platform for large scale video search based on relationships between objects in video segments, and the platform executes search based on probabilistically discriminative objects and relationships.

22 Claims, 11 Drawing Sheets
(6 of 11 Drawing Sheet(s) Filed in Color)

(51) Int. Cl.
*G06F 17/30* (2006.01)
*G06K 9/46* (2006.01)

(52) U.S. Cl.
CPC ... *G06F 17/30864* (2013.01); *G06K 9/00677* (2013.01); *G06K 9/00785* (2013.01); *G06K 9/4652* (2013.01); *G06K 9/6282* (2013.01)

(58) Field of Classification Search
USPC ............................................................ 382/209
See application file for complete search history.

(56) References Cited

U.S. PATENT DOCUMENTS

| | | |
|---|---|---|
| 8,200,648 B2 | 6/2012 | Boiman et al. |
| 8,254,699 B1 | 8/2012 | Zhao et al. |
| 8,396,884 B2 | 3/2013 | Singh et al. |
| 8,564,661 B2 | 10/2013 | Lipton et al. |
| 8,600,172 B2 | 12/2013 | Sengupta et al. |
| 8,711,217 B2 | 4/2014 | Venetianer et al. |
| 8,786,702 B2 | 7/2014 | Cobb et al. |
| 2007/0239694 A1 | 10/2007 | Singh et al. |
| 2007/0257986 A1 | 11/2007 | Ivanov et al. |
| 2009/0175538 A1 | 7/2009 | Bronstein et al. |
| 2009/0292685 A1 | 11/2009 | Liu et al. |
| 2011/0170596 A1 | 7/2011 | Shi et al. |
| 2013/0016213 A1 | 1/2013 | Yova et al. |
| 2013/0151562 A1 | 6/2013 | Fujii et al. |
| 2013/0201330 A1 | 8/2013 | Thornton et al. |
| 2013/0216094 A1 | 8/2013 | DeLean |
| 2013/0282747 A1 | 10/2013 | Cheng et al. |
| 2014/0136536 A1 | 5/2014 | Ramsey et al. |
| 2014/0201769 A1 | 7/2014 | Neumeier et al. |
| 2014/0315610 A1* | 10/2014 | Shachar ................... G06T 7/20 463/7 |
| 2016/0292881 A1* | 10/2016 | Bose .................. G06K 9/00342 |
| 2018/0012078 A1* | 1/2018 | Pournaghi .......... G06K 9/00718 |
| 2018/0253567 A1* | 9/2018 | Gonzalez-Banos ..... G06F 21/64 |
| 2018/0260615 A1* | 9/2018 | Chauhan ............ G06K 9/00288 |
| 2018/0268563 A1* | 9/2018 | Chen ......................... G06T 7/70 |
| 2018/0268674 A1* | 9/2018 | Siminoff .......... G08B 13/19613 |
| 2018/0285647 A1* | 10/2018 | Chen ................. G06K 9/00718 |
| 2018/0295375 A1* | 10/2018 | Ratner ................ H04N 19/436 |
| 2018/0338120 A1* | 11/2018 | Lemberger ............. H04N 7/186 |

OTHER PUBLICATIONS

Höferlin et al., "Interactive Schematic Summaries for Faceted Exploration of Surveillance Video", IEEE Transactions on Multimedia, vol. 15, Issue 4, pp. 908-920, Jun. 2013.

Little et al., "An Information Retrieval Approach to Identifying Infrequent Events in Surveillance Video", Proceedings of the $3^{rd}$ ACM Conference on International Conference on Multimedia Retrieval (ICMR), Dallas, Texas, pp. 223-230, Apr. 16-20, 2013.

Liu et al., "Review of Intelligent Video Surveillance with Single Camera", Proceedings of the Fourth International Conference on Machine Vision (ICMV 2011): Machine Vision, Image Processing, and Pattern Analysis, Singapore, Singapore, SPIE Proceedings vol. 8349, 5 pages, Jan. 11, 2012.

International Searching Authority, International Search Report—International Application No. PCT/US2015/061949, dated Jan. 27, 2016, together with the Written Opinion of the International Searching Authority, 18 pages.

* cited by examiner

Algorithm 1 Create Matching Graph

1: procedure CREATE MATCHING GRAPH($T, C, K_v(v_1, v_2), K_e(v_1, v_2, v_3, v_4)$)
2:    $H = G(V^h, E^h) \leftarrow 0$
3:    Iterate from root to leaves
4:    for all $v^t \in V^t$ do
5:       Compute the matches to this vertex
6:       $N_{v_t} \leftarrow (v_t, v_c)$ where $K_v(v_t, v_c) > \tau_v$
7:       if $Parent(v_t) \neq \emptyset$ then
8:          $E \leftarrow \emptyset$
9:          for all $(v_{t_p}, v_{c_p}) \in N_{Parent(v_t)}$ do
10:            $E \leftarrow E \cup (v_t, v_c)$ where $K_e(v_{t_p}, v_{c_p}, v_t, v_c) > \tau_e$
11:          end for
12:          $N_{v_t} \leftarrow N_{v_t} \cap E$
13:          $V^h \leftarrow E^h \cup N_{v_t}$
14:          $E^h \leftarrow E^h \cup E$
15:       else
16:          $V^h \leftarrow V^h \cup N_{v_t}$
17:       end if
18:    end for
19: end procedure

FIG. 9

Algorithm 2 Solve for Optimal Matches

1: procedure OPTIMIZE MATCHES($T, H$)
2:     $Score(v) \triangleq K_v(v[0], v[1])$
3:     $Score(v_1, v_2) \triangleq K_e(v_1[0], v_1[1], v_2[0], v_2[1])$
4:     Iterate from leaves to root
5:     for all $v_t \in T$ do
6:         if $Parent(v_t) \neq \emptyset$ then
7:             for all $v \in V^h$ where $v[0] == Parent(v_t)$ do
8:                 $Score(v) += max_{c \in Children(v)}(Score(c) + Score(v, c))1(c[0] == v_t)$
9:             end for
10:         end if
11:     end for
12: end procedure

LARGE SCALE VIDEO SEARCH USING QUERIES THAT DEFINE RELATIONSHIPS BETWEEN OBJECTS

RELATED ART

The present application is a U.S. National Stage application under 35 U.S.C. § 371 of International Application No. PCT/US2015/061949 filed on Nov. 20, 2015, which claims the benefit of U.S. Application No. 62/082,918, entitled "Large Scale Video Search Using Queries that Define Relationships Between Objects" and filed on Nov. 21, 2014, and U.S. Application No. 62/109,203, entitled "Large Scale Video Search Using Queries that Define Relationships Between Objects" and filed on Jan. 29, 2015, all of which have been hereby incorporated by reference in their entireties.

FEDERALLY SPONSORED RESEARCH

This invention was made with Government Support under Contract No. N00014-13-C-0288 awarded by the Office of Naval Research. The Government has certain rights in the invention.

TECHNICAL FIELD

The present disclosure relates to searching large volumes of videos, and more particularly, to finding videos whose content includes objects and relationships between the objects that most closely match the objects and relationships between objects in a user's graphical video search query.

BACKGROUND ART

It is known in the prior art to tag training data with learning classifiers and to train video search systems based on the tagged data. However, these video search systems require significant amounts of training data to function properly, and tagging training data can be time and process-intensive endeavor.

SUMMARY OF THE EMBODIMENTS

One embodiment of the present solution is a relationship-based video server system. The server system is programmed to provide a platform for large scale video search based on relationships between objects in video segments, and the platform executes search based on probabilistically discriminative objects and relationships. The server system is configured to run processes that, for each video segment received for storage in a video database, analyze image data in the video segment to recognize objects that are represented in the video segment and identify relationships between the objects. Additional processes determine, for each video segment, at least one of the most discriminative object or the most discriminative relationship, based on probabilities of occurrence for the recognized objects and identified relationships. Additional processes determine, for each video segment, a data structure with the recognized objects and identified relationships of the video segment and that is also based on at least one of the most discriminative object or the most discriminative relationship. Additional processes store the data structure for each video segment in the video database.

Additional processes receive a video search query defining relationships between a plurality of objects. Additional processes determine, based on probabilities of occurrence for the objects and relationships of the video search query, at least one of the most discriminative object or the most discriminative relationship of the video search query. Additional processes identify, based on at least one of the most discriminative object or the most discriminative relationship of the video search query, a subset of the data structures to search for video segments. Additional processes determine, for each video segment represented in the subset of the data structures, a score based on similarity between the objects and the relationships in the video search query and the objects and the relationships associated with the video segment. Additional processes display representations of video segments with the highest scores.

Additional processes may, for each video segment received for storage, analyze the image data in the video segment to identify at least one attribute of at least one recognized object. Additional processes may, for each video segment received for storage, determine a set of discriminative objects and relationships based on probabilities of occurrence for the recognized objects and identified relationships. Additional processes may, for each video segment received for storage, configure the data structure for the video segment by hashing the recognized objects and identified relationships of the video segment. Additional processes may, for each video segment received for storage, configure the data structure for the video segment by hashing the objects and the relationships in the set of discriminative objects and relationships. Additional processes may, for each video segment received for storage, stored the data structure for the video segment in a fuzzy hash table.

Additional processes may receive a video search query in a graphical representation, wherein each object is represented by a unique node and each relationship is represented by a unique edge. Additional processes may determine a set of discriminative objects and relationships for the video search query. Additional processes may determine a maximally discriminative spanning tree based on the set of discriminative objects and relationships for the video search query.

Additional processes may identify the subset of the data structures to search by downsampling the stored video segments based on at least one of the most discriminative object or the most discriminative relationship of the video search query. Additional processes may identify the subset of the data structures to search by downsampling the stored video segments based on the set of discriminative objects and relationships for the video search query. Additional processes may identify the subset of the data structures to search by creating a graph based on the maximally discriminative spanning tree of the video search query and the stored video segments. The graph may be a tree structure. In some embodiments, at least one relationship in the video search query is a spatial relationship.

Additional processes may determine, for each video segment represented in the subset of the data structures, the score based on similarity by computing subscores between the objects in the video search query and the objects in the video segment, computing subscores between the relationships in the video search query and the relationships in the video segment, and summing the subscores. Additional processes may determine, for each video segment represented in the subset of the data structures, the score based on similarity that accounts for tolerance levels of a user.

Additional processes may predict a user intent of the video search query, determine at least one potential alteration to the video search query based on the user intent, and display an altered video search query as a proposed search query for the user.

In some embodiments, each video segment has a duration of a pre-determined interval, and the duration may be 15 minutes.

One embodiment of the present solution is a computer program product having a non-transitory computer-readable medium with computer code thereon for searching large scale video data. The product includes program code for receiving a video search query defining relationships between a plurality of objects. The product includes program code for determining, based on probabilities of occurrence for the objects and relationships of the video search query, at least one of the most discriminative object or the most discriminative relationship of the video search query. The product includes program code for accessing a video database that stores video segments. The product includes program code for identifying, based on at least one of the most discriminative object or the most discriminative relationship of the video search query, a subset of the video segments stored in a video database to be subject to search. The product includes program code for determining, for each video segment in the subset subject to search, a score based on similarity between the objects and the relationships in the video search query and the objects and the relationships associated with the video segment. The product includes program code for displaying representations of video segments with the highest scores.

In some embodiments, the product includes program code for determining a set of discriminative objects and relationships for the video search query.

Further embodiments of the present solution include an apparatus for searching large scale video data, and a computer program product having computer code thereon configured to search large scale video data, when executed. In some embodiments, the product includes program code for receiving the video search query in a graphical representation, wherein each object is represented by a unique node and each relationship is represented by a unique edge. In some embodiments, the product includes program code for downsampling the stored video segments based on at least one of the most discriminative object or the most discriminative relationship of the video search query. The apparatus and computer program product both encompass the various features described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The foregoing features of embodiments will be more readily understood by reference to the following detailed description, taken with reference to the accompanying drawings, in which:

FIG. 9 is an exemplary process for creating a representation of video content that may be used for efficient searching;

FIG. 10 is an exemplary process for searching for videos whose content best matches the video search query.

DETAILED DESCRIPTION OF SPECIFIC EMBODIMENTS

Modern video surveillance systems amass large volumes of video content. For example, an airport may include numerous cameras positioned throughout its facilities, each one recording content on an on-going basis. Likewise, companies may position cameras in the parking lots of retail stores, and government agencies may set up cameras to monitor vehicular activity on highways. While these surveillance systems provide an enormous wealth of data, simply by the sheer volume of video content collected, searching the video content remains problematic.

For example, when a user searches videos for a particular activity, that activity may be expressed in a variety of ways. Suppose a user wants to search for an accident involving a vehicle. Although the collision may involve two or more vehicles, the collision may occur between one vehicle and a pedestrian or a bicyclist. Further, the vehicles may be cars, buses, trucks, or motorcycles. In this manner, the activity "vehicular collision" may be manifested in numerous forms. However, when users search videos, a keyword-based system may eliminate many potential matches from being found. In another example, some surveillance systems may extract objects (e.g., people, cars) from videos, and store the same. However, such systems analyze videos based on the temporal ordering of the objects contained therein, and this approach's ability to accurately describe activities is limited.

Various embodiments enable users to formulate video search queries that account for spatial relationships between objects, which permits videos to be searched for particular activities with greater accuracy. A user may specify objects that the user wishes to see in the videos and may describe the relationships between the objects. In this manner, users may create video search queries in a more intuitive manner, and using the information contained therein, the video search system may retrieve higher quality matches among the stored videos. Furthermore, the user may specify the extents to which the search results may deviate from the particular video search query. As a result, the video search system can search for videos in a more accurate manner while retaining potential search results that deviate from the user's exact query.

Figure 1:
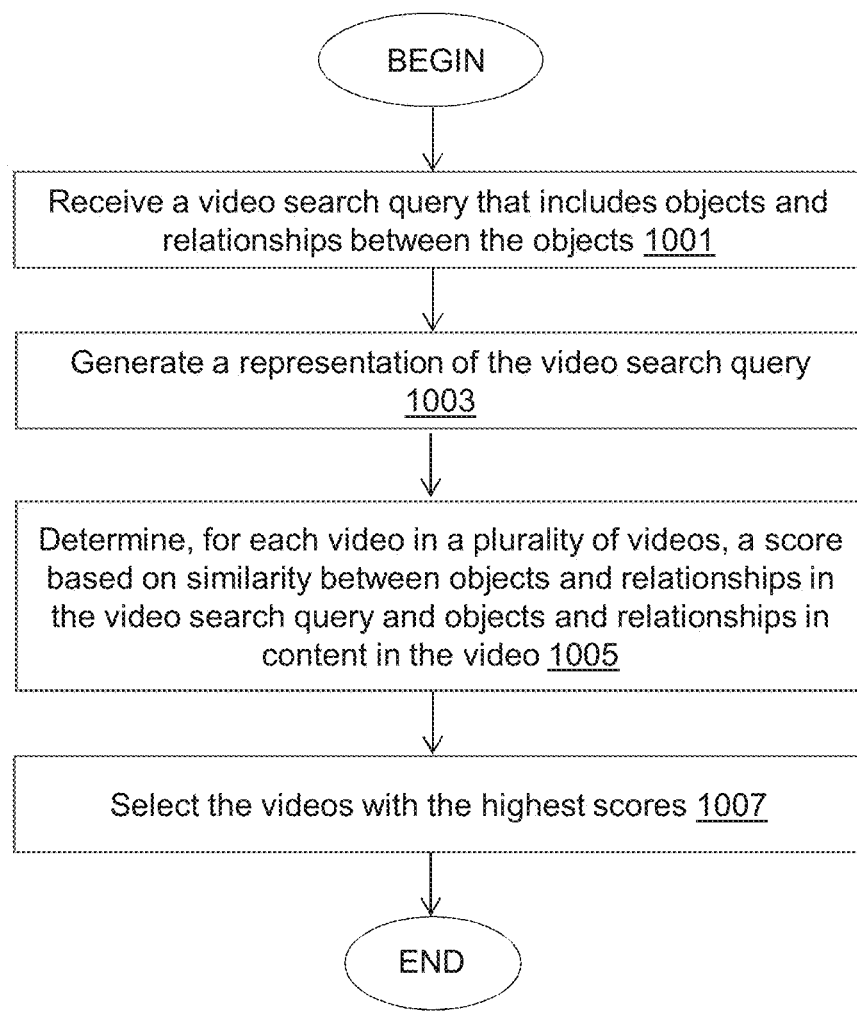
FIG. 1 is an exemplary flow diagram for searching large volumes of video data using queries that define relationships between objects.

In general overview, FIG. 1 depicts an exemplary flow diagram for searching large volumes of video data using queries that define relationships between objects. First, a video search system receives a video search query that includes objects and relationships between the objects (step 1001). For example, the video search system may provide a graphical user interface that enables a user to construct a graphical video search query. From this interface, the user may specify the objects that the user wants in the video search results. In this manner, the user may require a search result to include a "person", a "car", and a "package", by way of example. In another example, the user may require a search result to include a "person", a "dog", and a "car". Moreover, the user may specify characteristics of any given object. For example, the person may be a particular person (e.g., John Smith), the car may be red, and the package may be large.

In some embodiments, the user may select an object from a menu, such as a drop down menu, and position the object on the interface. Each object that the user chooses becomes a "node" (also referred to herein as "vertex") in the video search query.

From the graphical user interface, the user may also specify the relationships between the objects, and each relationship becomes an "edge" in the video search query. For example, a user may draw a line between two objects to indicate that the objects are related to one another and then specify the relationship. In various embodiments, the user may select a type of relationship from a menu and associate this relationship with the line connecting two objects. For example, a user may draw a line between "person" and "dog", select "near" from a menu of relationship types, and associate "near" with the line. In another example, a user may draw a line between "person" and "car", select "riding in" from a menu of relationship types, and associate "riding in" with the line.

In some embodiments, the video search system provides a user interface that receives video search queries as text queries. The user interface may include a single box that receives text. The user may input the objects required to be in the video, such as "person", "car", and "package", and define the relationships between the objects.

In some embodiments, the user may describe the requirements of the video search query, and the video search system may process the query to extract the objects and their relationships. The video search system may use natural language processing, or any other methods, for parsing the text input. For example, the user may input "A person is driving a car at about 35 mph, and a dog is sitting in the passenger seat", and the video search system may determine that the query includes a person, a car, and a dog. The system also determines that person and the dog are both positioned within the car, and that the car, person, and dog are all moving at about 35 mph. In some embodiments, the video search system may reformulate the user's input into a search query that the system can use for further processing, according to the processes described herein.

Further, the user may input the video search query as a string that uses Boolean or Boolean-like terms. In some embodiments, the user interface displays a list of relationships, such as "near", "moving", "still", "riding in", "disappears", that may be used for video search queries. Thus, the user may input a query like (car MOVING "35 mph") and (person RIDING IN car) and (dog RIDING IN car). In another example, a user might input a search query for a person carrying an object and putting it in the car trunk, as (person NEAR package) and (person NEAR car) and (package DISAPPEARS). As before, the video search system may reformulate the user's input into a search query that the system can use for further processing, according to the processes described herein.

After the video search system receives the video search query, the video search system generates a representation of the video search query (step 1003). Thus, the video search system may transform the video search query into a structure conducive for searching database(s) of videos.

In one example, the video search system may convert the video search query into a maximally discriminative query. When the user inputs a text string, the system may extract the objects and their relationships and then use statistics based on individual objects, relationships between particular objects, or both, to reformulate the query. Using the statistics, the system may determine which objects or relationships occur most infrequently. Then, the system may create a query that highlights these objects or relationships. In this manner, the system would create a search query that minimizes the number of videos needed for further consideration to determine if the videos match the search query's criteria.

In another example, the video search system may convert the video search query into a tree structure. Because the same graphical video search query may be represented by different tree structures, the video search system determines which tree structure highlights the most distinguishing characteristics of the search query (also referred to herein as the "maximally discriminative spanning tree"), to reduce the number of possible videos for initial and/or further consideration.

Then, the video search system determines, for each video in a plurality of videos, a score based on similarity between the objects and relationships of the video search query and objects and relationships of content in the video (step 1005). When the videos were first received for storage in the database(s), the video search system extracted objects, information about the objects themselves, and the relationships between the objects from the video content. This information was further processed and stored in a manner conducive to searching, which will be described in more detail below.

The video search system compares the objects and relationships from the user's video search query with the objects and relationships of video content, and assigns scores to videos based on the level of similarity, as will be described in more detail below. Thus, the video search system does not search for exact matches between the user input and the stored videos. Instead, the video search system still considers videos that have objects or relationships that are similar, rather than exactly the same, compared to those in the user query. However, the video search system may assign lower component scores for objects or relationships that are merely similarly. In this manner, the more a video's content deviates from the search query, the lower its score, but the video search system may still consider it.

Finally, the video search system selects the videos with the highest scores (step 1007). In various embodiments, the video search system may select ten, or any other number, or videos with the highest scores, and display thumbnails for the videos to the user. Alternatively, the video may automatically begin playing the video with the highest score, and arrange the remaining videos as a prospective playlist.

Figure 2:
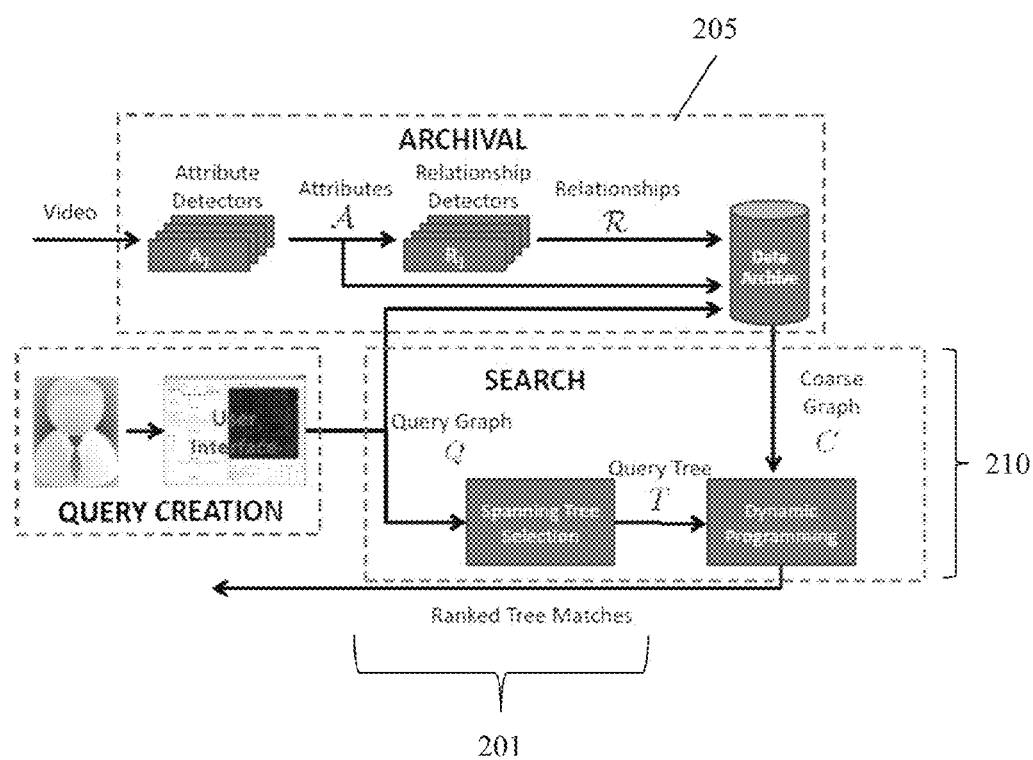
FIG. 2 is an exemplary flow diagram for creating a representation of a video search query based on its objects and relationships, creating representations of stored videos based on the objects and relationships in their contents, and finding videos whose objects and relationships most closely match the objects and relationships of the video search query.

FIG. 2 depicts an implementation of the video search system described in FIG. 1. In particular, FIG. 2 depicts an exemplary flow diagram for receiving a video search query and creating a corresponding representation 201, creating representations of stored videos based on the objects and relationships in their contents 205, and finding videos whose corresponding objects and relationships most closely match the objects and relationships of the video search query 205. Creating a representation of a video search query 201 will be described in more detail in reference to FIGS. 3-6, creating representations of the objects and relationships of the contents of stored videos 205 will be described in more detail in reference to FIG. 7, and finding videos whose corresponding objects and relationships most closely match the objects and relationships of the video search query 205 will be described in more detail in reference to FIG. 8.

Figure 3:
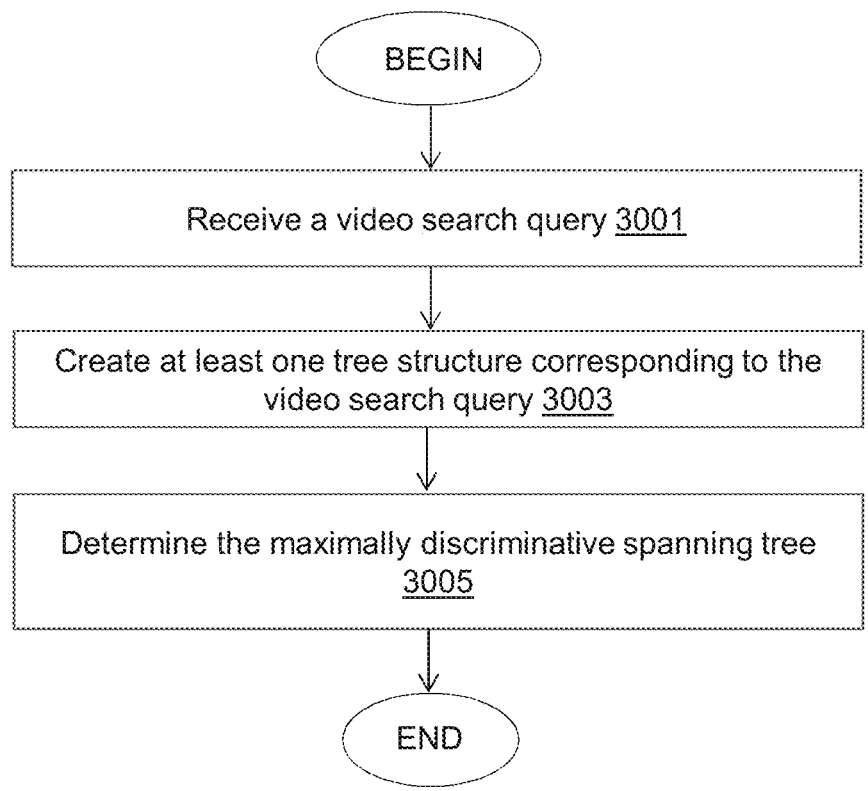
FIG. 3 is an exemplary flow diagram for creating a tree structure corresponding to the objects and relationships from a graphical video search query.

In some embodiments, to create a representation of a video search query, as described in FIG. 3, the video search system first receives a graphical video search query from a user (step 3001). As previously discussed, a user may create a query by positioning nodes, corresponding to objects, on the interface and connecting the nodes with edges, each edge defining the relationship between the respective objects.

In some embodiments, the user may also specify characteristics of the objects (also referred to herein as "attributes"). The user may select an attribute from a menu on the graphical user interface and associate the attribute with an object. For example, the user may indicate the color or size. The user may specify a general direction of motion of an object, such as "moving from left to right", or the approximate speed of motion, such as "moving between 45-60 mph". Alternatively, the user may require the object to be at rest, e.g., "no motion". In another example, the user may indicate that one object has a constant presence in the video, or that the object disappears from view. Furthermore, the user may specify a particular identity for an object, such as requiring a person to be "John Smith" or a car to be a "sedan".

The user or the video search system may identify images, video, or other multi-media that depict exemplary relationships between objects. For example, the user may upload images or videos that provide examples of what particular relationships, such as "near", connote to the user. In another example, the user may upload a video that demonstrates the speed at which a user wants an object in target video to move. The video search system may analyze the relationship in the provided media and use this data as the reference point when determining whether videos in the database(s) include objects that are have the relationships required by the user's query. In some embodiments, the video search system may access existing databases of images or videos that depict the relationships, and extract information about the relationships to use as reference points. Moreover, the video search system may search databases over computer networks, such as the Internet, to find multi-media that include such relationships.

In various embodiments, the user may specify tolerance levels for deviations from the attributes. For example, the user may manually input a tolerance level for an attribute. After indicating that an object should be three (3) feet wide, the user may also indicate that objects between 2.5-3.5 feet wide may also be considered. Likewise, the user may wish to search for a red object, but because colors may vary depending on the amount of light in a scene, pink objects may be acceptable candidates for a match. Although the user may wish to look primarily for dogs, the user may also permit search results that include cats instead. In another example, after requiring an object to be still, the user may nevertheless allow the object to move between 1-5 mph, in case an external object causes the object of interest to move by accident. In some embodiments, the user may specify tolerance levels, and in alternate embodiments, the video search system may store predefined tolerance levels for any attribute displayed in the graphical user interface. Moreover, the user may configure the video search system to default to predefined tolerance levels, or to enable users to input tolerance levels that override the predefined ones.

The user may also specify relationships between the objects. The user may select a relationship from a menu on the graphical user interface and associate the relationship with two objects. For example, the user may indicate that two objects are near one another, two objects move in tandem with one another, or that one object is being carried by another. In other examples, the user may indicate that one object is less than five (5) feet away from a second object, or that two objects are moving towards one another.

The user or the video search system may identify images that depict the objects of interest. For example, the user may upload images of a person, such as "John Smith". The user may upload images of the particular car of interest in his or her search query. In some embodiments, the user may upload video or other multi-media content that depicts the objects that are referenced in the search query. The video search system may extract the objects and their attributes from the provided data, and use this data as the reference point when determining whether videos in the database(s) include objects that are similar to those in the user's query.

Similar to attributes, the user may specify tolerance levels for deviations from the selected relationships. For example, after indicating that two objects should be less than five (5) feet from one another, the user may also indicate that objects separated by 5-7 feet may also be considered. For a search query in which two objects are moving towards one another, the user may also indicate that the objects may stop moving at approximately the same time (e.g., thereby, indicating a collision).

Figure 4:
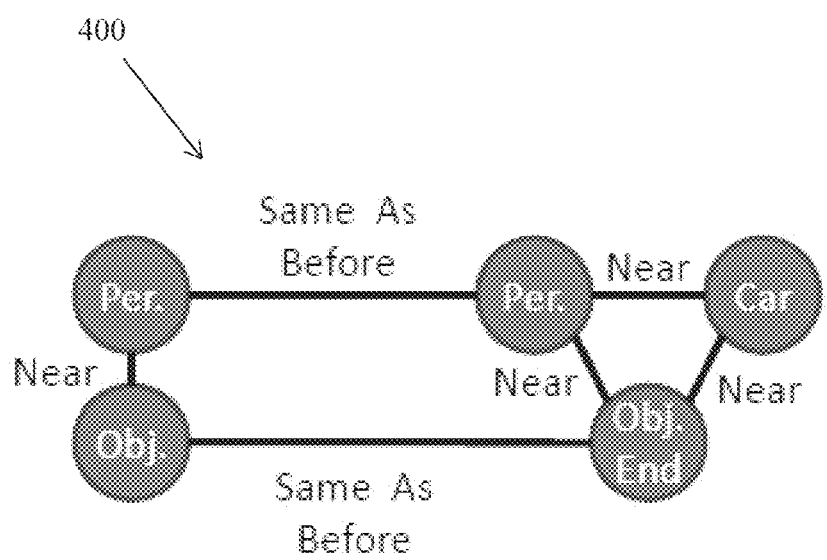
FIG. 4 is an exemplary graphical video search query input by a user, which depicts objects and defines relationships between the objects.

An exemplary graphical video search query which depicts objects and defines relationships between the objects is shown in FIG. 4. In this example, the user is creating a query for a person loading a package into a car. Since the query requires three objects—the person, the car, and the package—a user will insert three nodes, each corresponding to one of the objects, into the search query. Since all three objects must be near one another for the person to load the package, the user may draw edges between the objects to define the "near" relationship between all of them (e.g., the triangle in the right part of FIG. 3). Also, the package disappears from view after the person loads the package into the car, and this characteristic may be incorporated by assigning the "end" attribute to the package node (e.g., "Object end"). Additionally, to make the search query more specific, the user may require that the person be proximate to the package before it disappears. Thus, the user may add additional nodes for the person and package, require the person and package to be proximate to one another, and require this continued proximity when the package disappears (e.g., the "person" and "object" nodes on the left part of FIG. 4).

Additionally, the video search system may analyze the inputted search query to predict the user's intent and make suggestions for the search query. In some embodiments, the system stores commonly occurring objects and relationships. As the user inputs a search query, the system may recognize that the user is creating a particular relationship between objects, and display a recommended search query.

After the user finishes constructing a graphical video search query, the video search system may store information from the query. In some embodiments, the video search query may be represented as:

$$VSQ = Q(V^q, E^q, A^q, R^q, L^q)$$

Through this disclosure, the superscript "q" is used to indicate that the variables pertain to the user's video search query.

In this representation, $V^q$ represents the objects in the user input, with each object corresponding to a node in the query. In the notation, the representation of a node may also be referred to as a "vertex". The i-th object would be represented by $V^q_i$.

$A^q$ represents the characteristics for each of the nodes. Thus, the characteristics for the i-th node would be represented by $A^q_i$.

$L^q$ represents the tolerance levels for the characteristics of the nodes. Thus, the tolerance levels for the characteristics for the i-th node would be represented by $L^q_i$.

$E^q$ represents the edges indicating that vertices are related. Thus, for all pairs of related nodes $v_1$ and $v_2$, $(v_1, v_2) \in E^q$ $R^q$ represents the particular relationships between nodes. Thus, for each pair of related nodes $v_1$ and $v_2$, $R^q_{(v1, v2)}$ represents the set of relationships between the two nodes ($v_1$, $v_2$).

$L^q_v$ represents the tolerance levels for the relationships. Thus, for each pair of related nodes $v_1$ and $v_2$, $L^q_{(v1, v2)}$ represents the tolerance levels for the relationships between the two nodes ($v_1$, $v_2$).

Figure 5:
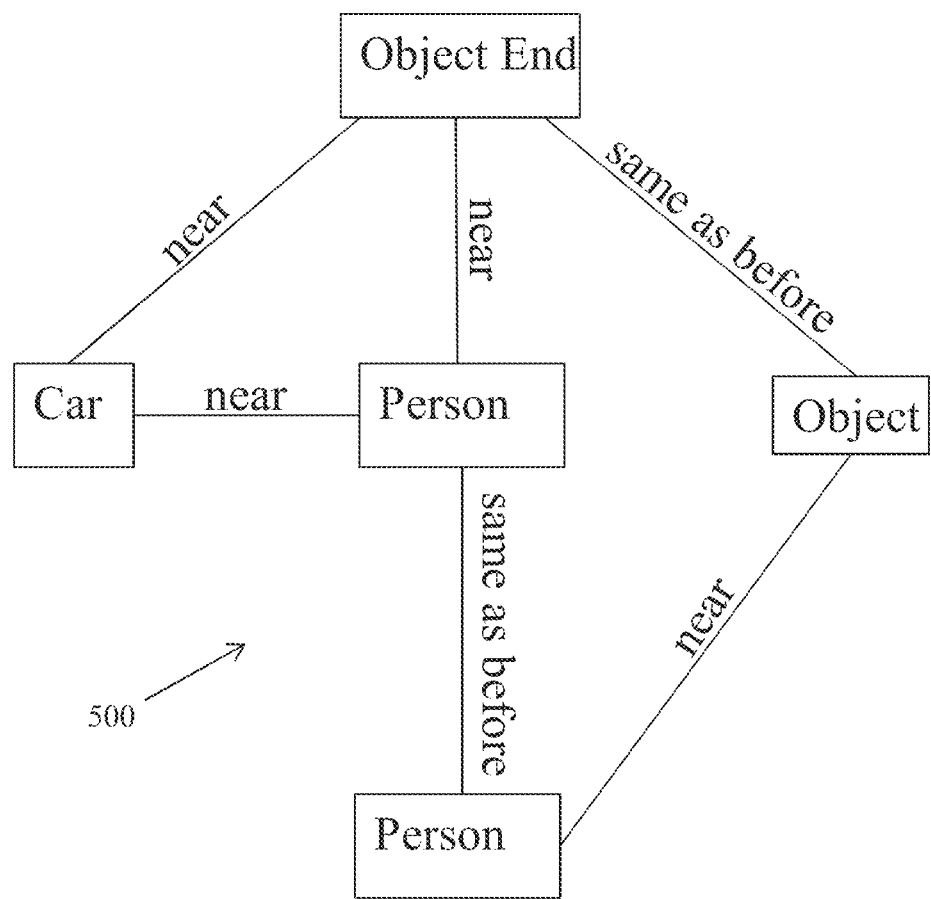
FIGS. 5 and 6 are exemplary tree structures for the video search query of FIG. 4, wherein the tree structure in FIG. 5 is more discriminative than the tree structure in FIG. 6.
Figure 6:
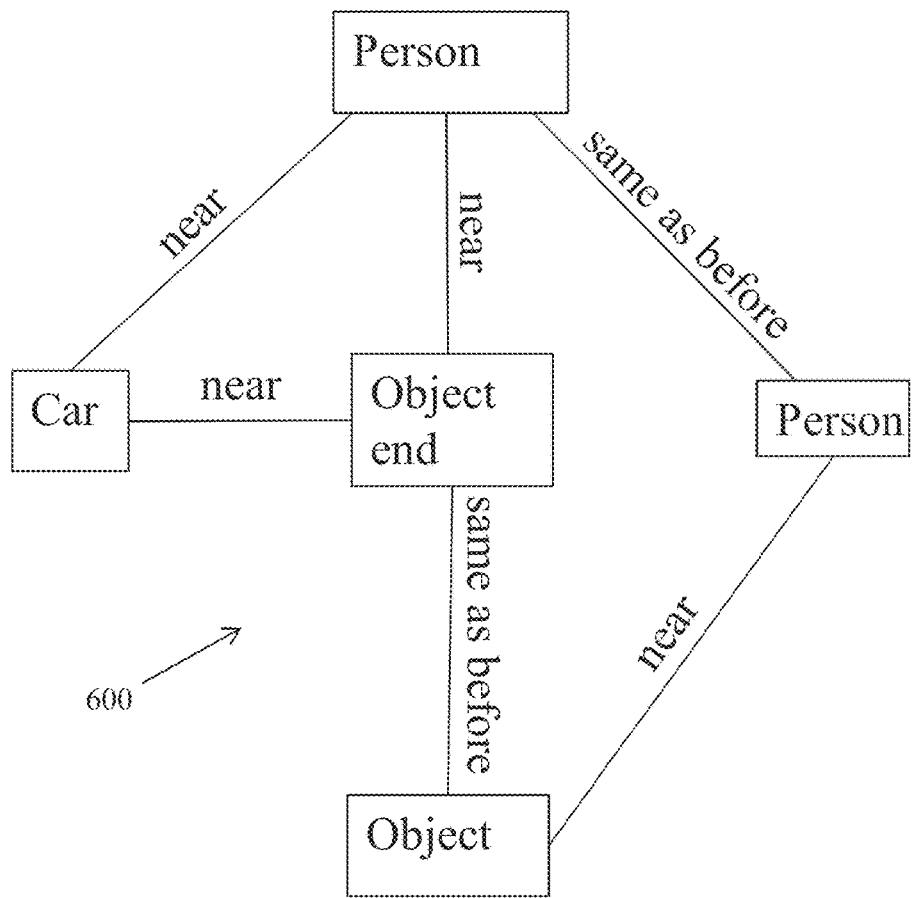

After the user inputs the video search query, the video search system creates at least one tree structure corresponding to the video search query (step 3003). In various embodiments, the video search system selects one of the nodes to serve as a tree's root, and creates the remainder of the tree based on the nodes and relationships of the video search query relative to the root node. By way of example, FIGS. 5 and 6 depict two tree structures that both correspond to the video search query of FIG. 4. In FIG. 5, the tree structure 500 is rooted at "Object end", whereas in FIG. 6, the tree structure 600 is rooted at "Person".

Furthermore, the video search system determines the maximally discriminative spanning tree ("MDST") (step 3005). The maximally discriminative spanning tree highlights the most distinguishing (e.g., the least common) characteristics of the search query. By way of example, the tree structure 500, rooted at "Object end" which is connects to the "car" node via a "near" relationship, is more discriminative than the tree structure 600, which is rooted at "Person". Because videos with objects that disappear near cars are far less common than videos that have a person, a tree structure rooted with the less common node with its associated attributes will be more discriminative than tree structures rooted at more commonly occurring nodes. Thus, when the tree structure 500 is used as a basis for search, compared to the tree structure 600, non-matching videos will be eliminated from consideration more quickly and the overall search will require less processing time. Thus, selecting a highly discriminative tree structure advantageously minimizes the processing time of the search.

To evaluate the discriminativeness of tree structures, the video search system may use the probabilities of occurrence for the nodes and relationships. In some embodiments, the video search system stores probabilities regarding attributes for nodes and relationships between nodes, which may be denoted as $P_m(a)$ and $P_m(r)$, respectively. These probabilities may correspond to the percentage of videos within the database(s) that include the corresponding attributes for the node or relationship between nodes.

Any given tree may be represented by:
$T=T(V^t, E^t, A^t, R^t)$, with a root at $T_o$ Through this disclosure, the superscript "t" is used to indicate that the variables pertain to a tree that corresponds to the user's video search query.

The probability that any given node in the tree will appear in videos in the database is estimated by the product of the probabilities of the attributes for the node:

$$P_m(v) = \prod_{a \in A^t_v} P_m(a)$$

Similarly, the probability that any given set of relationships between two nodes in the tree will appear in the videos is estimated by the product of the probabilities of each relationship in the set:

$$P_e(v_1, v_2) = \prod_{r \in R^t_{(v_1, v_2)}} P_m(r)$$

Suppose $P_i$ represents the path from the root node $T_o$ to the i-th node in the tree, $T_i$. Then, the probability that a video would include the nodes from $T_o$ to $T_i$ may be represented by:

$$\mathcal{P}_m(v_i) = \prod_{v \in P_i} P_m(v) \prod_{(v_1, v_2) \in P_i} P_m(v_1, v_2)$$

As a result, the probability that a video would include all of the nodes in a tree T would be:

$$S(T) = \sum_{\mathcal{P}_i \in \mathcal{P}} \prod_{v \in \mathcal{P}_i} P_m(v) \prod_{(v_1, v_2) \in \mathcal{P}_i} P_m(v_1, v_2)$$

The video search system thus seeks a tree structure that minimizes the value of S(T). The probability S(T) is dominated by the root node and the nodes that are nearest to it. As such, the total score of each tree depends disproportionately on the discriminativeness of the nodes and relationships near the root, as their contribution to the value of S(T) is far greater than that of lower nodes.

In some embodiments, the video search system randomly generates tree structures from the video search query and samples from the created structures. For example, the video search system may use Broder's method to sample from the set of trees. The system may compute the discriminativeness of the sampled trees, and select the tree with minimal S(T) and maximum discriminativeness as the MDST.

In various embodiments, the video search system determines a maximally determinative query from a user's text input. As described above, the user may input objects for the video and relationships between the objects, such as (car MOVING "35 mph") and (person RIDING IN car). The video search system processes the string to extract objects and their relationships. Using statistics, such as the stored probabilities regarding attributes for objects and relationships between objects (e.g., the probabilities denoted as $P_m(a)$ and $P_m(r)$), the video search system may determine which objects or relationships occur most infrequently. Then, the video search system may create a search query based on the most infrequent objects and relationships extracted from the user input. Since the search query is based on infrequent occurring objects and relationships, use of the particular search query minimizes the number of videos that the video search system would need to consider to determine if their contents match that of the user's query. In this manner, creating a maximally discriminative search query would reduce the search space within the video database(s).

Figure 7:
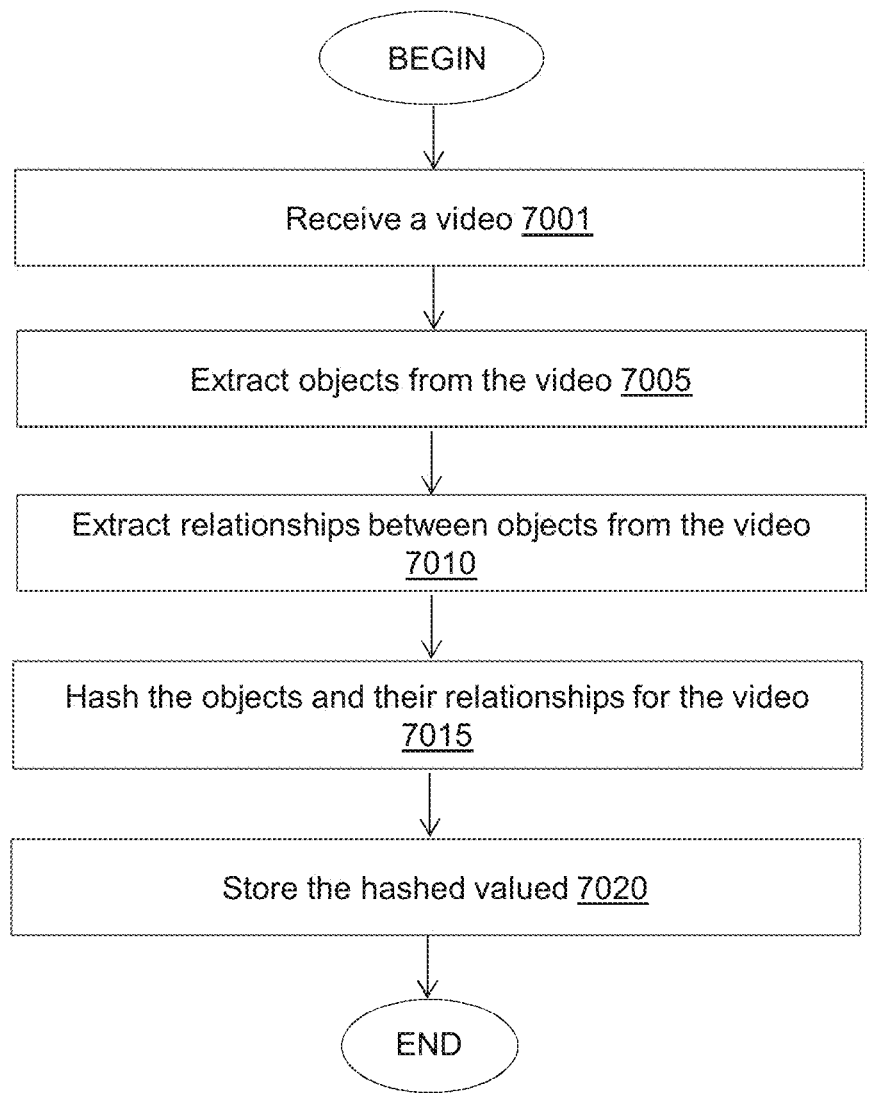
FIG. 7 is an exemplary flow diagram for representing videos in a manner that facilitates efficient search and retrieval.

Turning now to creating representations of the objects and relationships of the contents of stored videos 205, FIG. 7 depicts an exemplary flow diagram for representing videos in a manner that facilitates efficient search and retrieval. Although the description herein refers to a single video, one of ordinary skill would appreciate that all videos received and stored in the database(s) are subject to the same processing. In general overview, the video search system receives a video (step 7001). Then, the video search system extracts objects and their characteristics from the video (step 7005), and subsequently extracts the relationships between the objects (step 7010). The video search system hashes the objects and the relationships (step 7015) and stores the hashed values in the database (step 7020).

In some embodiments, the video search system may receive the videos (step 7001) from various surveillance sites. By way of example, the system may obtain videos from a number of cameras positioned at different locations along a highway, different locations within a parking lot, or different locations within an airport. Each camera may record and store video at its respective location, and transmit the video to the search system. In some embodiments, a camera may transfer video footage in real time. In other embodiments, a camera may store video footage recorded over a predetermined amount of time, and then transfer the video to the search system at predetermined intervals. For example, a camera may transfer 15 minutes worth of recorded video every 15 minutes, and thereafter, begin over-recording its memory with new video content.

When the video search system receives a video, the system extracts its objects and their characteristics (step 7005). The system may use various object detectors, such as the Viola-Jones detector, to extract items, people, vehicles, and other discrete entities. The video search system may also extract the color and size of objects. Moreover, the video search system may compare pixels between adjacent video frames to determine the direction and/or magnitude of motion of an object, and such comparison may also identify when the object appears or disappears.

Based on the objects, the video search system extracts the relationships between the objects (step 7010). The system computes the relationships between pairs of objects, and identifies particular relationships to be stored in the database(s). In some embodiments, the video search system only stores discriminative relationships, which are relatively rare compared to other types of relationships. For example, fewer objects will be "near" one another, or be the "same as before", than objects that are "far from" one another. Consequently, relationships such as "near" and "same as before" better distinguish one video from another than "far from". Thus, when only discriminative relationships are stored, the video search system can search the database(s) for matching videos more efficiently.

The video search system hashes the objects, their individual characteristics, and the relationships (step 7015) and stores the hashed values in the database (step 7020). The video search system may hash the location of the video with a particular object, the value of the object, and the value of the object's characteristics, and store the values in an inverted index. The system may use standard hashing for the objects themselves. In some embodiments, the system may use locality sensitive hashing for characteristics that may be subject to some variation, such as size and color. Likewise, the video search system may hash the values of the relationships and store them in the index. Moreover, any of the values may be hashed using fuzzy hashing, which enables objects and relationships to be retrieved within tolerance levels of a video search query.

Figure 8:
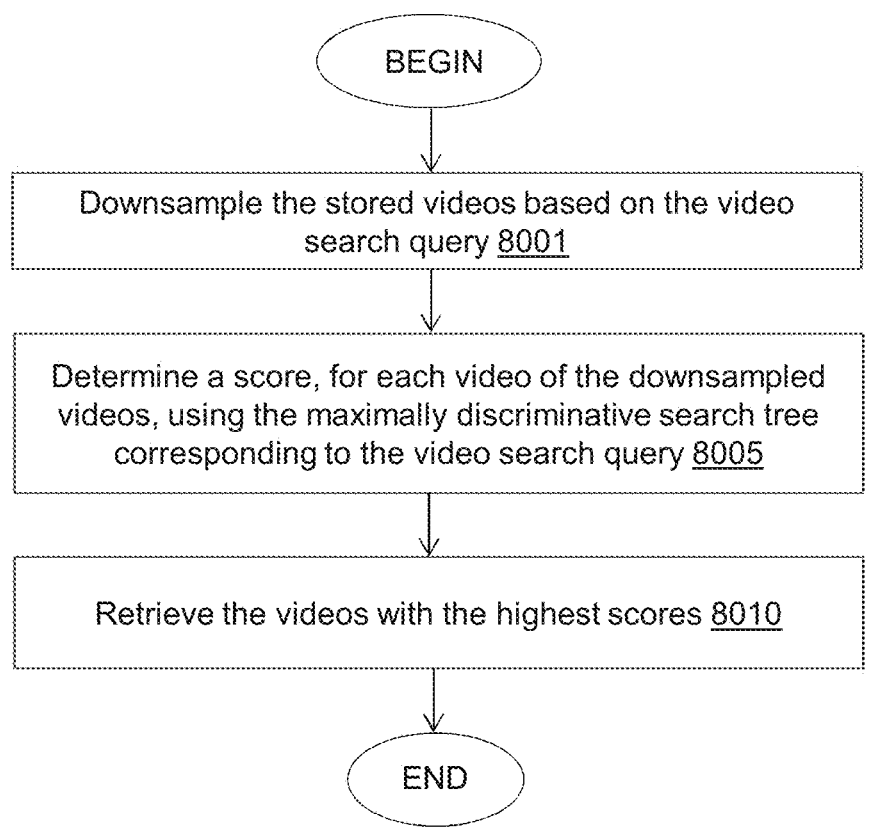
FIG. 8 is an exemplary flow diagram for searching for videos that most closely match the user's video search query.

The video search system uses the maximally discriminative spanning tree (MDST) or the maximally discriminative query to search the database of hashed values to find videos whose content most closely matches the user's video search query. Referring now to FIG. 8, the video search system may first downsample the stored videos based on the user search query (step 8001). Downsampling reduces the number of videos for full comparison against the video search query by eliminating from further consideration the videos with negligible chance of matching the query. In some embodiments, the video search system builds a graph with videos from the database(s) that include at least one object or one relationship from the search query, within the tolerance levels set by the user. Because this resulting graph (also referred to herein as a "coarse graph") is based on the requirements of the video search query, the coarse graph will include all potential video matches in the database(s), as well as false positives. Nevertheless, the coarse graph greatly reduces the potential search space for the video search system.

The coarse graph may be represented by:

$$C=C(V^c,E^c,A^c,R^c)$$

Through this disclosure, the superscript "c" is used to indicate that the variables pertain to the coarse graph created from the stored videos and the user's video search query.

To create the coarse graph, the video search system begins with the objects. The system retrieves the locations of videos that have the objects $V^q$ and their respective characteristics $A^q_v$. For example, the system may compute a hash code for the object, hash codes for each characteristic of the object, and take the intersection of the bins corresponding to the codes. The system adds a node $v_i$ to $V^c$ for each of these locations and stores the characteristics in $A^c_i$.

Additionally, for every relationship between nodes, $(v_1, v_2) \in E^q$, the video search system retrieves the locations of videos that satisfy every relationship in $R^q_{(v1, v2)}$, whose nodes are also in $V^c$. For each pair of nodes, the system adds an edge to $E^c$ and stores the set of relationships for the edge in $R^c$. In this manner, the video search system ensures that all videos from the database that have the individual nodes, their characteristics, and their relationships are incorporated into the coarse graph C.

In some embodiments, the video search system creates a matching graph H from the coarse graph C, which will be searched to find videos. The matching graph H may be represented by $$H=H(V^h,E^h)$$

In this matching graph H, each node $v \in T \otimes C$ is a tuple denoting a proposed assignment between a node in the maximally discriminative spanning tree T and a node in the coarse graph H. First, the video search system adds matching nodes from C for the root node in T, and then adds matching successive nodes that satisfy both node and edge relationships in the MDST. FIG. 9 illustrates exemplary processes for creating the matching graph, in which $\tau_v$ may be a threshold score for a node to be added to the matching graph H and $\tau_e$ may be a threshold score for an edge to be added.

Then, the video search system determines a score, for each video of the downsampled videos, using the maximally discriminative search tree corresponding to the video search query (step 8005). For a prospective video match, the video search system may compute a subscore for a node in the video search query which indicates the extent to which the node, or a similar node, appears in the video. Likewise, the video search system may compute a subscore for a relationship in the video search query which indicates the extent to which the relationship, or a similar relationship, appears in the video. The system may add all of the subscores to calculate an overall similarity score for the video.

Scoring may be based on kernel functions, which have some tolerance for error. For individual nodes, the similarity score may be the sum of similarities for each attribute belonging to that node. Thus, the score may be represented by:

$$K_v(v_1, v_2) = \sum_{j=1}^{|\mathcal{A}|} K_{a(j), l(j)}(a_v(j))$$

a(j) corresponds to the characteristics of a node l(j) corresponds to the tolerance level with respect to a characteristic of a node For individual relationships, the similarity score may be the sum of the similarities associated with that edge. Thus, the score may be represented by $$K_e(e_1, e_2) = \sum_{j=1}^{|\mathcal{R}|} K_{r(j), l(j)}(r_{e_2}(j))$$

r(j) corresponds to the relationships between two nodes l(j) corresponds to the tolerance level with respect to the relationships between the nodes To find prospective matches to the video search query, the video search system may traverse the maximally discriminative spanning tree from leaves to root to determine the optimal solution for each root match. For each leaf node in the MDST, the video search system computes a similarity score. Then, the video search system may merge nodes in the matching graph H into their parent node, keeping the node that has the best score. The system may repeat this process until only the matches in the matching graph H to the root node(s) of the MDST remain.

For each of these potential root node matches, the video search system computes a similarity score for their associated trees, and in turn, the extent to which the content of the associated video matches the video search query. In some embodiments, the score may be determined by:

$$S(Q, C, M) = \sum_{v_q \in V^q} K_v(v_q, M(v_q)) + \lambda \sum_{(v_{q_1}, v_{q_2}) \in E^q} K_e(v_{q_1}, v_{q_2}, M(v_{q_1}), M(v_{q_2})) \quad (4)$$

Then, ranking the scores of the videos, the video search system may retrieve the videos with the highest scores (step 8010).

Figure 11:
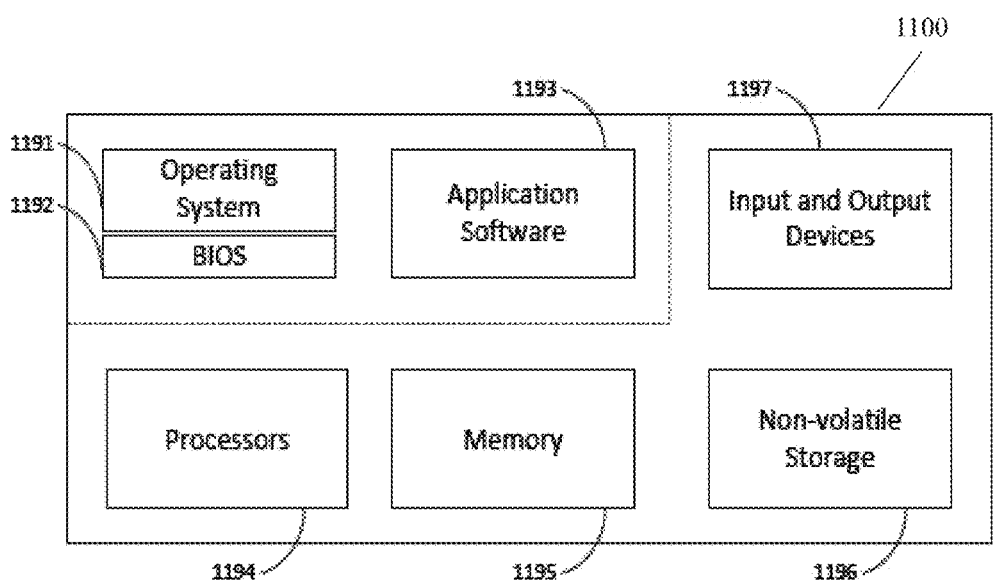
FIG. 11 is an exemplary computing device that may be used to implement the invention.

FIG. 11 schematically shows a logical view of an exemplary computing system 1100 that may be used with illustrative embodiments of the present invention. A computing system 1100 may have various hardware allocated to it by a system operator, including one or more processors 1194 (e.g., logical CPUs), volatile memory 1195, non-volatile storage 1196, and input and output ("I/O") devices 1197 (e.g., network ports, video display devices, keyboards, and the like). The computing system 1100 may store program code that, when executed by the one or more processors 1194, performs any of the steps described herein. In some embodiments, the server system described herein may be implemented on one computing system 1100, and in the embodiments, the system may be implemented on a plurality of computing systems 1100 that operate in conjunction with one another. The computing system 1100 may accessible using a data network, which may be inclusive of any data network known in the art, such as a local area network ("LAN"), a virtual private network ("VPN"), the Internet, or a combination of these networks, or the like.

The disclosed apparatus and methods may be implemented as a computer program product for use with a computer system. Such implementation may include a series of computer instructions fixed either on a tangible medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a tangible removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Of course, some embodiments of the invention may be implemented as a combination of both software (e.g., a computer program product) and hardware. Still other embodiments of the invention are implemented as entirely hardware, or entirely software. The embodiments of the invention described above are intended to be merely exemplary; numerous variations and modifications will be apparent to those skilled in the art. All such variations and modifications are intended to be within the scope of the present invention as defined in any appended claims.

Although the above discussion discloses various exemplary embodiments of the invention, it should be apparent that those skilled in the art can make various modifications that will achieve some of the advantages of the invention without departing from the true scope of the invention.

What is claimed is:

1. A relationship-based video server system, programmed to provide a platform for large scale video search based on relationships between objects in video segments, the platform executing search based on probabilistically discriminative objects and relationships, wherein the server system is configured to run processes that:
for each video segment received for storage in a video database,
analyze image data in the video segment to (1) recognize objects that are represented in the video segment and (2) identify relationships between the objects,
determine, based on probabilities of occurrence for the recognized objects and identified relationships, at least one of (1) the most discriminative object or (2) the most discriminative relationship in the video segment,
configure, based on at least one of the most discriminative object or the most discriminative relationship, a data structure that includes the recognized objects and identified relationships of the video segment;
store the data structure in the video database;
receive a video search query defining relationships between a plurality of objects;
determine, based on probabilities of occurrence for the objects and relationships of the video search query, at least one of the most discriminative object or the most discriminative relationship of the video search query;
identify, based on at least one of the most discriminative object or the most discriminative relationship of the video search query, a subset of the data structures to search for video segments;
determine, for each video segment represented in the subset of the data structures, a score based on similarity between the objects and the relationships in the video search query and the objects and the relationships associated with the video segment; and
display representations of video segments with the highest scores.

2. The relationship-based video server system of claim 1, wherein the server system is configured to run processes that, for each video segment received for storage, analyze the image data in the video segment to identify at least one attribute of at least one recognized object.

3. The relationship-based video server system of claim 1, wherein the server system is configured to run processes that, for each video segment received for storage, determine a set of discriminative objects and relationships based on probabilities of occurrence for the recognized objects and identified relationships.

4. The relationship-based video server system of claim 3, wherein the server system is configured to run processes that, for each video segment received for storage, configure the data structure for the video segment by hashing the objects and the relationships in the set of discriminative objects and relationships.

5. The relationship-based video server system of claim 1, wherein the server system is configured to run processes that, for each video segment received for storage, configure the data structure for the video segment by hashing the recognized objects and identified relationships of the video segment.

6. The relationship-based video server system of claim 1, wherein the server system is configured to run processes that, for each video segment received for storage, stored the data structure for the video segment in a fuzzy hash table.

7. The relationship-based video server system of claim 1, wherein the server system is configured to run processes that receive a video search query in a graphical representation, wherein each object is represented by a unique node and each relationship is represented by a unique edge.

8. The relationship-based video server system of claim 1, wherein the server system is configured to run processes that determine a set of discriminative objects and relationships for the video search query.

9. The relationship-based video server system of claim 8, wherein the server system is configured to run processes that identify the subset of the data structures to search by downsampling the stored video segments based on the set of discriminative objects and relationships for the video search query.

10. The relationship-based video server system of claim 8, wherein the server system is configured to run processes that determine a maximally discriminative spanning tree based on the set of discriminative objects and relationships for the video search query.

11. The relationship-based video server system of claim 10, wherein the server system is configured to run processes that identify the subset of the data structures to search by creating a graph based on the maximally discriminative spanning tree of the video search query and the stored video segments.

12. The relationship-based video server system of claim 11, wherein the graph is a tree structure.

13. The relationship-based video server system of claim 1, wherein the server system is configured to run processes that identify the subset of the data structures to search by downsampling the stored video segments based on at least one of the most discriminative object or the most discriminative relationship of the video search query.

14. The relationship-based video server system of claim 1, wherein the server system is configured to run processes that determine, for each video segment represented in the subset of the data structures, the score based on similarity by (1) computing subscores between the objects in the video search query and the objects in the video segment, (2) computing subscores between the relationships in the video search query and the relationships in the video segment, and (3) summing the subscores.

15. The relationship-based video server system of claim 1, wherein the server system is configured to run processes that determine, for each video segment represented in the subset of the data structures, the score based on similarity that accounts for tolerance levels of a user.

16. The relationship-based video server system of claim 1, wherein the server system is configured to run processes that (1) predict a user intent of the video search query, (2) determine at least one potential alteration to the video search query based on the user intent, and (3) display an altered video search query as a proposed search query for the user.

17. The relationship-based video server system of claim 1, wherein each video segment has a duration of a pre-determined interval.

18. The relationship-based video server system of claim 17, wherein the pre-determined interval is 15 minutes.

19. The relationship-based video server system of claim 1, wherein at least one relationship in the video search query is a spatial relationship.

20. A computer program product having a non-transitory computer-readable medium with computer code thereon for searching large scale video data, the computer program product comprising:
program code for receiving a video search query defining relationships between a plurality of objects;
program code for determining, based on probabilities of occurrence for the objects and relationships of the video search query, at least one of the most discriminative object or the most discriminative relationship of the video search query;

program code for accessing a video database that stores video segments;

program code for identifying, based on at least one of the most discriminative object or the most discriminative relationship of the video search query, a subset of the video segments stored in a video database to be subject to search;

program code for determining, for each video segment in the subset subject to search, a score based on similarity between the objects and the relationships in the video search query and the objects and the relationships associated with the video segment; and program code for displaying representations of video segments with the highest scores.

21. The computer program product of claim 20, further comprising:

program code for receiving the video search query in a graphical representation, wherein each object is represented by a unique node and each relationship is represented by a unique edge.

22. The computer program product of claim 20, further comprising:

program code for downsampling the stored video segments based on at least one of the most discriminative object or the most discriminative relationship of the video search query.

\* \* \* \* \*